REEL FOR ENDLESS MAGNETIC TAPES

Filed April 9, 1965 2 Sheets-Sheet 1

Jan. 3, 1967 MAMORU NAMIKAWA ETAL 3,295,781

REEL FOR ENDLESS MAGNETIC TAPES

Filed April 9, 1965 2 Sheets-Sheet 2

United States Patent Office 3,295,781
Patented Jan. 3, 1967

3,295,781

REEL FOR ENDLESS MAGNETIC TAPES

Mamoru Namikawa and Masaoki Sekine, Tokyo, Japan, assignors to TDK Electronics Company, Limited, Tokyo, Japan, a corporation of Japan Filed Apr. 9, 1965, Ser. No. 447,016
Claims priority, application Japan, July 31, 1964, 39/61,099
1 Claim. (Cl. 242—55.19)

This invention relates to reels for endless magnetic tapes to be used in ordinary tape recorders and endless tape recorders.

Conventional reels for endless magnetic tapes (which shall be known as endless tapes hereinafter) are complicated in the structure and are very inconvenient to handle because, when they are to be replaced or fitted, they will break or complicatedly tangle.

Further, the conventional reels for endless tapes have many defects that, in case tapes of different contents are to be used, a reel for each content will have to be prepared to be used and will be complicated to handle and that a large space is required to keep them.

The present invention is suggested to eliminate such defects as are described above.

An object of the present invention is to provide a reel for endless tapes which is easy to handle, is convenient to replace tapes and is small.

The present invention shall be explained in detail with reference to the drawings.

Figure 1:
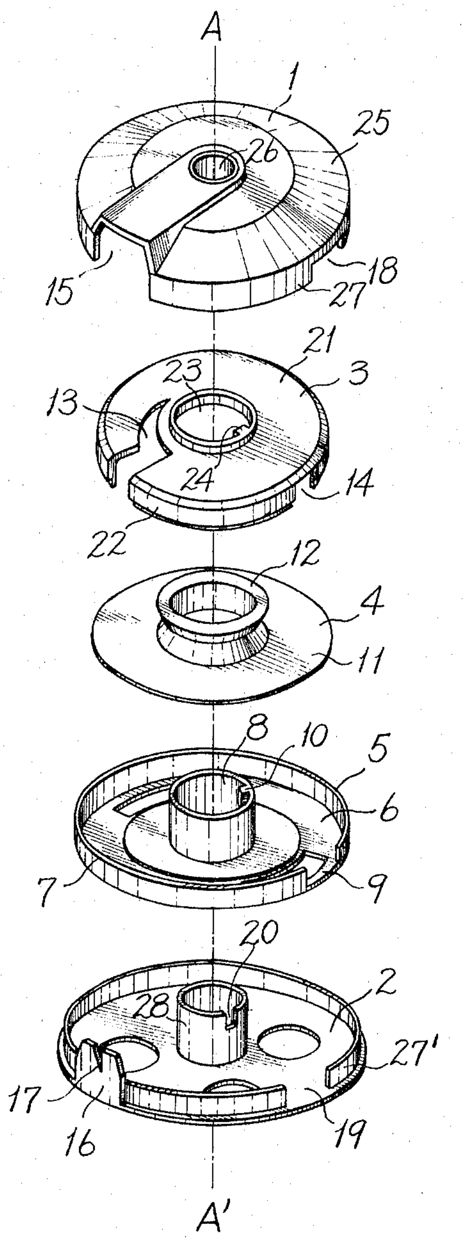
FIGURE 1 is a perspective view illustrating the structures of the respective parts of the present invention in the order of their vertical arrangement.

In FIGURE 1 which is a perspective view illustrating the structure of a reel for endless tapes of the present invention, 1 is an upper cover for endless tapes, 2 is a lower cover and 3, 4 and 5 are an upper lid, spool and lower lid, respectively, forming a magazine part.

First of all, the details of the structure of the lower lid 5 shall be described. A cylindrical magazine wall 7 is made on the periphery of a disk 6 forming a bottom part and a cylinder 8 is erected upright in the center part of the disk 6. A cut 9 for winding in tapes is made in a part of said magazine wall 7. A projection 10 is made inside said cylinder 8 erected in the center.

The bottom part 11 of the spool 4 is formed like a disk. In the center of said bottom part 11 is provided a cylinder 12 on which a tape is to be wound and which is to be fitted on the cylinder 8 of the lower lid 5. The outside diameter of said bottom part 11 is smaller than the inside diameter of the lower lid 5. The inside diameter of the cylinder 12 is a little larger than the outside diameter of said cylinder 8.

The upper lid 3 is formed of an upper surface part 21 in the form of a disk and a cylindrical side wall 22 on the periphery of said upper surface part 21. A hole 14 for winding in tapes is made in a part of said side wall 22 and a hole 13 for pulling out tapes is made in the side wall 22 and the upper surface part 21. Said pull-out hole 13 is arcuately cut in from the periphery to the center part. A hole 23 is made in the center of the upper surface part 21. A projection 24 is made inside said hole 23.

The upper cover 1 and the lower cover 2 are formed to be substantially the same as the upper lid 3 and the lower lid 5 of the magazine part, respectively. The upper surface part 25 of the upper cover 1 is formed like a disk. A hole 26 is made in the center of the upper surface part 25. A hole 15 for fitting a projection 16 made on the peripheral part of the lower cover 2 is made in a part of the cylindrical side wall 27 made on the periphery of the upper surface part 25.

A cylindrical side wall 27′ is made on the periphery of the bottom part in the form of a disk of the lower cover 2. A hole 19 for winding in tapes is made in a part of said side wall 27. The projection 16 is erected upright on the side wall 27. A pull-out hole 17 is made in the head part of said projection 16. A cylinder 28 is fixed in the center of the bottom part. A cut 20 is made in a part of said cylinder 28.

In such formation as is described above, a tape is wound on the spool 4, said spool 4 is then set on the lower lid 5 and the upper lid 3 is fitted from above to form a magazine part. The tape is to be pulled out through the hole 13 for pulling out tapes and wound in through the holes 9 and 14 for winding in tapes.

Figure 2:
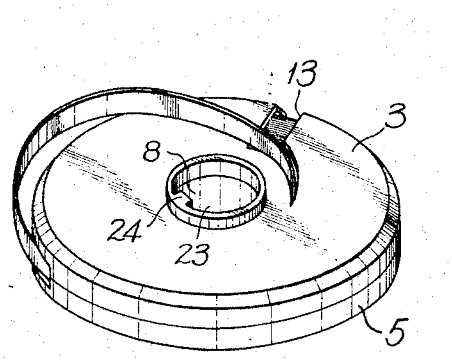
FIGURE 2 is a perspective view of a magazine part of the present invention.

A perspective view of the magazine part as fitted with the tape is shown in FIGURE 2.

The upper and lower covers 1 and 2 are further fitted to such magazine part as is described above to form a reel for endless tapes according to the present invention.

That is to say, as shown in FIGURE 1, the respective parts are set coaxially with the line A—A′ so as to be vertically integral.

When the tape is pulled out, the spool 4 will rotate, the tape on one side will come out through the hole 13 for pulling out tapes in the upper lid 3 and will be pulled out through the hole 17 for pulling out tapes in the lower cover 2. The tape on the other side will be wound in through the holes 18 and 19 for winding in tapes in the upper and lower covers 1 and 2 and through the holes 9 and 14 for winding in tapes in the upper and lower lids 3 and 5.

The relation between the magazine part and the upper and lower covers 1 and 2 is defined by the projection 10 in the lower lid 5 and the cut 20 in the lower cover 2.

As described above, according to the present invention, as the reel for endless tapes has a magazine part, it is easy to replace the tape. The reel can be manufactured more cheaply and is smaller than any conventional reel for endless tapes. Further, in keeping the tape, it can be protected from any outside damage by means of the projection in the center of the magazine.

What is claimed is:

A reel for an endless magnetic tape comprising a lower lid having a first disk forming a first bottom part;
a first cylinder provided upright in the center of said first disk;
a first projection provided inside said first cylinder;
a cylindrical magazine wall provided on the periphery of said first disk; and
a first aperture for winding in tapes provided in said cylindrical magazine wall;

an upper lid having a first upper surface part in the form of a disk;
a second aperture provided in the center of said first upper surface part;
a second projection provided inside said second aperture;
a first cylindrical side wall provided on the periphery of said disk-like first upper surface part;
a third aperture for winding in tapes provided in said first cylindrical side wall; and
a fourth aperture for pulling out tapes provided in said first cylindrical side wall and upper surface part continuously;

an upper cover having a second upper surface part in the form of a disk;

a fifth aperture provided in the center of said second upper surface part;

a second cylindrical side wall provided on the periphery of said second upper surface part;

a sixth aperture provided in said second cylindrical side wall; and a projection-receiving aperture formed in said second cylindrical side wall and disk-like second upper surface part;

a lower cover having a bottom part in the form of a disk;

a third cylindrical side wall provided on the periphery of said bottom part;

a seventh aperture for winding in tapes provided in said third cylindrical side wall;

a third, generally upright, projection having a head part, said third projection provided partly on said bottom part of said lower cover adjacent to said third cylindrical side wall and adapted to fit into said projection-receiving aperture of said upper cover;

a pull-out aperture provided in said head part of said third projection;

a generally upright cylinder provided in the center of said disk-like part of said lower cover; and an eighth aperture provided in said generally upright cylinder and a spool having a bottom part in the form of a disk; and a cylinder fixed in the center of said bottom part;

said spool being rotatably contained in the lower lid and said upper and lower lids being fitted together and contained in said upper and lower covers when fitted together, whereby said first and second projections on the lower and upper lids fit into said eighth aperture of the lower cover and said generally upright third projection of the lower cover fits into said projection-receiving aperture of said upper cover.

References Cited by the Examiner

UNITED STATES PATENTS

| | | | |
|---|---|---|---|
| 2,699,332 | 1/1955 | MacKenzie | 242—55.19 |
| 3,134,552 | 5/1964 | Woelfel | 242—55.19 |

FRANK J. COHEN, *Primary Examiner.*

L. D. CHRISTIAN, *Assistant Examiner.*